E. HUSON.
Wagon.
No. 16,648.
Patented Feb. 17, 1857.
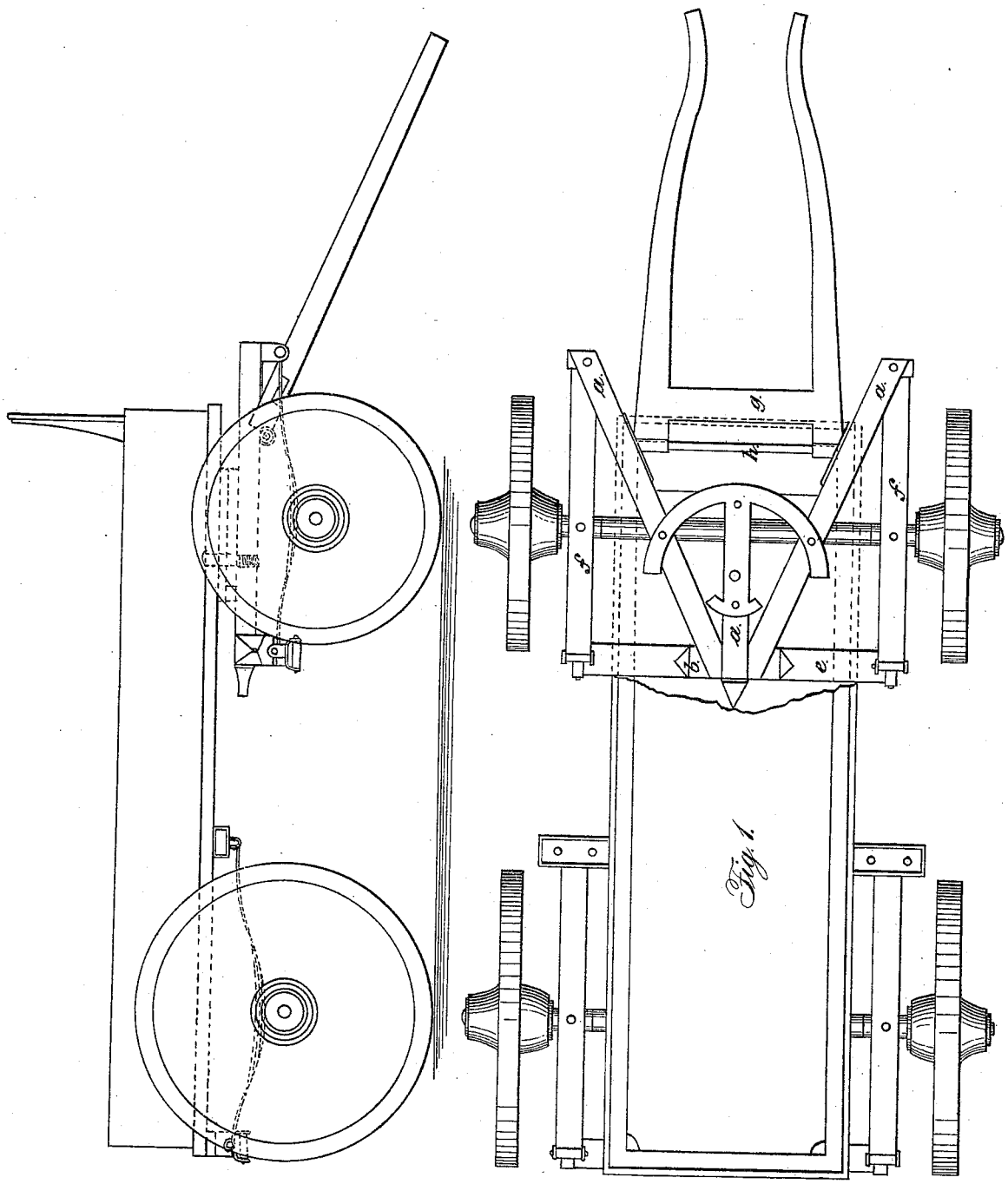

UNITED STATES PATENT OFFICE.

EDGAR HUSON, OF ITHACA, NEW YORK.

GEARING FOR WAGONS.

Specification forming part of Letters Patent No. 16,648, dated February 17, 1857; Reissued March 5, 1867, No. 2,500.

*To all whom it may concern:*

Be it known that I, EDGAR HUSON, of Ithaca, in the county of Tompkins and State of New York, have invented a new and Improved Gearing for Wagons and other Vehicles; and I do hereby declare that the following is a full and exact description thereof, reference being had to the accompanying figures and letters of reference marked thereon.

The nature of my invention consists, as applied to platform wagons (and the principle is the same for others) in making the frame on which the front of the body rests nearly in the form of the capital letter A, consisting of two splinter-bars "$a$" "$a$" Fig. 1, united at one end by and upon the head piece "$b$" and connected in the center by the cross beam "$c$", said cross-beam connected to the head piece "$b$" by the connecting beam "$d$".

The head piece "$b$," when the frame is completed is firmly fastened to the center of the spring "$e$," which is fastened at each end to the back end of the springs "$f$," "$f$," which are themselves fastened to the axletree; the front ends of the splinter-beams "$a$," "$a$," are attached to the forward ends of the side springs "$f$," "$f$,"; thus completing its bearings upon the axletree. By this form of splinter-bars and manner of attaching them to the springs their forward ends are open and free; and back of their front extremities and between the side springs the pole or thills "$g$" are attached to the splinter bars by the rod "$h$" or other usual or convenient mode of fastening. The former and usual method of making said frame has been to have the cross beam "$c$" attached to the forward extremities of the splinter bars and the pole or thills attached to projections in front of said extremities, thus removing the horse a foot or more farther from the wagon and requiring so much more room on which to turn or drive.

What I claim as my invention and desire to secure by Letters Patent is:

So making the frame, described in the accompanying specification, as to leave the forward extremities of said frame open so as to receive the pole or thills between and back of the forward ends of the side springs thus bringing the animal nearer the wagon and thereby making the draft easier and requiring less room in which to turn.

EDGAR HUSON.

Attest:
J. O. W. INGERSOLL,
M. B. TIDEY.

[FIRST PRINTED 1912.]